(12) United States Patent
Huille

(10) Patent No.: US 12,091,029 B2
(45) Date of Patent: Sep. 17, 2024

(54) METHOD AND DRIVER ASSISTANCE SYSTEM FOR PROVIDING VISUAL INFORMATION ABOUT A FIRST VEHICLE IN AN ENVIRONMENT OF A SECOND VEHICLE, COMPUTER PROGRAM AND COMPUTER-READABLE MEDIUM

(71) Applicant: Valeo Schalter und Sensoren GmbH, Bietigheim-Bissingen (DE)

(72) Inventor: Arnaud Huille, Bobigny (FR)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 114 days.

(21) Appl. No.: 17/628,670

(22) PCT Filed: Jul. 21, 2020

(86) PCT No.: PCT/EP2020/070498
§ 371 (c)(1),
(2) Date: Jan. 20, 2022

(87) PCT Pub. No.: WO2021/018660
PCT Pub. Date: Feb. 4, 2021

(65) Prior Publication Data
US 2022/0258759 A1    Aug. 18, 2022

(30) Foreign Application Priority Data

Jul. 26, 2019   (DE) .................... 10 2019 120 215.9

(51) Int. Cl.
*B60W 50/14*   (2020.01)
*B60K 35/00*   (2006.01)
(Continued)

(52) U.S. Cl.
CPC ............. *B60W 50/14* (2013.01); *B60K 35/00* (2013.01); *B60W 40/04* (2013.01); *B60W 50/00* (2013.01);
(Continued)

(58) Field of Classification Search
CPC ...... G08G 1/0967; G08G 1/166; G08G 1/167; G01C 11/00; G01C 11/02; B60Q 1/00;
(Continued)

(56) References Cited

U.S. PATENT DOCUMENTS 8,983,705 B2    3/2015   Zhu et al.
9,103,671 B1 *  8/2015   Breed .................. G01S 13/865
(Continued)

FOREIGN PATENT DOCUMENTS

DE        102017122261 A1    3/2019

OTHER PUBLICATIONS

NPL Search (Oct. 18, 2023).*
(Continued)

*Primary Examiner* — Van T Trieu
(74) *Attorney, Agent, or Firm* — Osha Bergman Watanabe & Burton LLP

(57) ABSTRACT

The invention relates to a method for providing visual information about a first vehicle (1) in an environment (4) of a second vehicle (2). The method comprises the step of detecting a reduced visibility of the first vehicle (1) in the environment (4) of the second vehicle (2) and the steps of transmitting an image captured by a camera (7) of the first vehicle (1) to a display device of the second vehicle (2) and of integrating an object (13) representing the first vehicle (1) into the image displayed on the display device of the second vehicle (2). The object (13) is represented in the image (12) at a position which corresponds to the current position of the first vehicle (1) in the environment (4) of the second vehicle
(Continued)

(2). The invention further relates to a computer program, a computer-readable medium and a driver assistance system (3).

12 Claims, 5 Drawing Sheets

(51) Int. Cl.
    *B60W 40/04*     (2006.01)
    *B60W 50/00*     (2006.01)
    *B60K 35/10*     (2024.01)
    *B60K 35/23*     (2024.01)
    *B60K 35/28*     (2024.01)
    *B60K 35/29*     (2024.01)

(52) U.S. Cl.
    CPC .............. *B60K 35/10* (2024.01); *B60K 35/23* (2024.01); *B60K 35/28* (2024.01); *B60K 35/29* (2024.01); *B60K 2360/149* (2024.01); *B60K 2360/176* (2024.01); *B60K 2360/179* (2024.01); *B60K 2360/1868* (2024.01); *B60K 2360/349* (2024.01); *B60W 2050/146* (2013.01); *B60W 2420/403* (2013.01); *B60W 2540/225* (2020.02); *B60W 2554/4041* (2020.02)

(58) Field of Classification Search
    CPC ........... B60R 1/00; B60R 11/00; B60R 11/04; B60R 2300/105; B60W 30/04; B60W 30/14; B60W 30/16; B60W 40/00; B60W 40/04; B60W 40/06; B60W 50/14
    See application file for complete search history.

(56) References Cited

U.S. PATENT DOCUMENTS

| | | | |
|---|---|---|---|
| 2005/0134440 A1* | 6/2005 | Breed | G01S 17/931 701/45 |
| 2014/0300743 A1 | 10/2014 | Kumon | |
| 2014/0341434 A1 | 11/2014 | Lin et al. | |
| 2015/0145995 A1 | 5/2015 | Shahraray et al. | |
| 2015/0197248 A1* | 7/2015 | Breed | G08G 1/09626 340/905 |
| 2015/0325120 A1 | 11/2015 | Cho et al. | |
| 2016/0347246 A1* | 12/2016 | Fujita | G02B 6/0036 |

OTHER PUBLICATIONS

International Search Report and Written Opinion in corresponding International Application No. PCT/EP2020/070498, mailed Oct. 6, 2020 (9 pages).

German Search Report issued in corresponding German Application No. 10 2019 120 215.9, dated Jan. 8, 2020 (6 pages).

\* cited by examiner

METHOD AND DRIVER ASSISTANCE SYSTEM FOR PROVIDING VISUAL INFORMATION ABOUT A FIRST VEHICLE IN AN ENVIRONMENT OF A SECOND VEHICLE, COMPUTER PROGRAM AND COMPUTER-READABLE MEDIUM

TECHNICAL FIELD

The invention relates to a method for providing visual information about at least one first vehicle in an environment of a second vehicle. The method comprises the step of detecting a reduced visibility of the at least one first vehicle in the environment of the second vehicle. The invention further relates to a computer program, a computer-readable medium on which the computer program is stored, and a to driver assistance system.

BACKGROUND OF THE INVENTION

Document U.S. Pat. No. 8,983,705 B2 describes a method for detecting bad weather conditions such as fog using laser data provided by a LIDAR unit of a trailing car, i.e. by a car driving behind another car, and by analyzing images captured by a camera of the trailing car. For example, image data may be processed to identify objects in the image. When the objects indicated by the camera image do not agree with the objects indicated by the data from the LIDAR unit, an indication that fog is present can be made.

However, even if the presence of fog is detected by such a method, the preceding car or leading vehicle driving in front of the trailing car is still not well visible for a driver of the trailing car.

BRIEF SUMMARY OF THE INVENTION

It is therefore an object of the present invention to provide a method, a computer program, a computer-readable medium and a driver assistance system, which allow obtaining an increase in driving safety.

This object is solved by a method having features of claim 1.

Advantageous configurations with convenient further developments of the invention are specified in the dependent claims, the description and the drawings.

The method according to the invention for providing visual information about at least one first vehicle in an environment of a second vehicle, comprises the step of detecting a reduced visibility of the at least one first vehicle in the environment of the second vehicle.

The method further comprises the steps of transmitting an image captured by a camera of the at least one first vehicle to a display device of the second vehicle and of integrating an object representing the at least one first vehicle into the image displayed on the display device of the second vehicle. Herein, the object is represented in the image at a position which corresponds to the current position of the at least one first vehicle in the environment of the second vehicle. Thus, by looking at the display device of the second vehicle, a driver of the second vehicle can see the at least one first vehicle as if there was not reduced visibility of the at least one first vehicle. The method therefore allows obtaining an increase in driving safety.

As the image or frame captured by the camera of the at least one first vehicle is received by the second vehicle and then transmitted to the display device of the second vehicle the visibility is increased for the driver of the second vehicle looking at the display device of the second vehicle. Provided that the reduced visibility of the at least one first vehicle is detected, the object which represents the at least one first vehicle is added to the image displayed on the display device. This makes the first vehicle visible to the driver of the second vehicle. And representing or showing the object in the image at the location or position which corresponds to the current position of the first vehicle in the real or actual environment enables the driver of the second vehicle to particularly well estimate a distance between the first vehicle and the second vehicle. The driver can also particularly well estimate a time inter vehicles, i.e. the time which is necessary to cover the distance between the first vehicle and the second vehicle depending on the driving speeds of the two vehicles. The method therefore enables the driver of the second vehicle to drive more safely.

The improved visibility of the at least one first vehicle which is represented by the object added to the image displayed on the display device is particularly helpful during bad weather events such as the presence of fog, strong rain and the like. This is due to the fact, that the driver of the second vehicle looking at the display device of the second vehicle can see the at least one first vehicle as if there was no fog, heavy rain or the like.

In particular, offering such a better visibility of the first vehicle to the driver of the second vehicle enables the so called vacuum effect to be diminished or avoided. The vacuum effect, which can be responsible for accidents when the visibility is reduced or impaired due to fog, heavy rain or the like, describes the situation in which the second vehicle is driving behind the first vehicle. In order not to lose sight of the rearward lights of the first vehicle in front of the second vehicle, the driver of the second vehicle tends to increase his driving speed. At the same time, a driver of the first vehicle, who sees the second vehicle approaching from behind, tends to accelerate. This can result from a fear of the driver of the first vehicle to be hit by the second vehicle or from a unpleasant feeling of the driver of the first vehicle when the distance between the two vehicles decreases. Thus, instead of slowing down the driving speed of both vehicles increases.

This so called vacuum effect can, in particular in combination with not respecting safety distances, cause an accident of at least one of the vehicles. The reason is that the drivers of the first vehicle and the second vehicle, respectively, travel at a speed which is not adapted to the reduced visibility conditions caused by for example fog, rain or the like. However, by showing the image with the object added to the image on the display device of the second vehicle to the driver of the second vehicle, the vacuum effect can be avoided or at least reduced.

Preferably, a view representing at least a section of an area ahead of the at least one first vehicle is transmitted as the image displayed on the display device of the second vehicle. The view can in particular be captured by a front camera of the at least one first vehicle. As the view representing at least the section of the area ahead of at least one first vehicle is shown on the display device of the second vehicle, the visibility of the environment is improved for the driver of the second vehicle looking at the display device of the second vehicle. This is due to the fact that the camera of the first vehicle which is travelling in front of the second vehicle can capture more details of the surroundings of the first vehicle than it is the case for a driver or for a camera of the second vehicle, having the first vehicle in his or its field of view. Therefore, utilizing the view representing at least the section of the area ahead of the first vehicle as the image displayed on the display device leads to an improved visibility of the environment for the driver of the second vehicle.

Preferably, a view captured by the camera of the at least one first vehicle before reaching its current position is displayed as the image on the display device of the second vehicle. In other words, the camera of the first vehicle captures a view before the vehicle reaches the current position. Thus, the view captured by the camera of the first vehicle corresponds to the situation when the first vehicle is located or situated at a previous position. And preferably this view captured at the previous position is transmitted or transferred as the image to the second vehicle. This has several advantages.

For one thing, the view captured by the camera of the first vehicle before reaching its current position corresponds to a view taken when the first vehicle is less far away from the second vehicle than in the situation in which the first vehicle has reached its current position. Consequently, the risk of fog or the like impairing the visibility in an area between the second vehicle and the first vehicle is decreased.

On the other hand, a zone in which there is no fog or the like around the object representing the at least one first vehicle in the image is larger than in a situation in which a view captured by the camera of the first vehicle having reached its current position would be utilized as the image. Therefore, the object representing the at least one first vehicle can be particularly well recognized or distinguished by the driver of the second vehicle looking at the display device of the second vehicle.

The camera of the at least one first vehicle can for example be a video camera which captures images with a given frequency, i.e. a predetermined number of images per second. The view captured by the camera of the first vehicle before reaching the current position of the first vehicle can in particular be the image or frame captured immediately before the image or frame captured at the current position of the first vehicle. However, it is also possible to utilize another one of the images taken by the camera before the first vehicle has reached its current position, as long as the image corresponds to a situation in which the first vehicle is located ahead of the second vehicle at its current position.

Preferably, as the object representing the at least one first vehicle a three-dimensional model of the at least one first vehicle is displayed on the display device of the second vehicle. By adding the three-dimensional model of the first vehicle to the image displayed on the display device of the second vehicle, a particularly realistic image of the first vehicle is shown to the driver of the second vehicle looking at the display device of the second vehicle. Therefore, the driver of the second vehicle can assess the traffic situation in a particularly realistic manner.

Preferably, data defining the three-dimensional model are transmitted from a communication device of the at least one first vehicle to a communication device of the second vehicle. In other words the two vehicles can be connected to each other over a wireless communication line or communication link established between the communication devices such that a car-to-car or vehicle-to-vehicle communication is enabled. Such a vehicle-to-vehicle communication between the at least one first vehicle and the second vehicle makes it particularly simple to present to the driver of the second vehicle a realistic three-dimensional model of the first vehicle on the display device of the second vehicle. Further, less storage space for storing three-dimensional models in a storage device of the second vehicle is necessary. Thus, the effort and the expenses for presenting the three-dimensional model of the first vehicle on the display device of the second vehicle are reduced.

The current position of the at least one first vehicle in the environment of the second vehicle can be determined by at least one sensor device of the second vehicle. The sensor device can be configured as or comprise a camera and/or a laser device such as a laser scanner. In particular by utilizing a laser scanner the current position of the at least one first vehicle can be detected with a high accuracy, even if the first vehicle cannot or can hardly be detected by a camera of the second vehicle. However, when data obtained by a camera of the second vehicle and a laser device such as a laser scanner of the second vehicle are both analyzed, the reliability of the determination of the current position of the first vehicle can be particularly high.

Alternatively or additionally position data indicating the current position of the at least one first vehicle in the environment of the second vehicle can be transmitted to the second vehicle. For example, the first vehicle can be equipped with a position sensor such as a GPS receiver (GPS=global positioning system) or the like. Consequently, particularly accurate position data of the at least one first vehicle, which indicate the current position of the first vehicle, can be provided to the second vehicle. Therefore, the effort for 20 determining the current position of the at least one first vehicle in the environment of the second vehicle can at least be reduced.

The image comprising the object representing the at least one first vehicle can be superimposed on least one further image captured by a camera of the second vehicle. Herein, the least one further image is displayed on a screen of the second vehicle. In such a configuration it is sufficient if the driver of the second vehicle takes a short look at the screen in order to perceive the object representing the at least one first vehicle in the environment of the second vehicle. This is particularly simple to be implemented, if the second vehicle has such a screen for displaying images captured by a camera, in particular by a front video camera of the second vehicle. The screen can in particular be integrated into an instrument panel of the second vehicle.

Preferably, a view representing at least a section of the environment of the second vehicle is displayed on the screen as the least one further image, wherein the section is situated ahead of the second vehicle. In this configuration the image comprising the object is merely added to the further images captured by the camera, in particular front camera, of the second vehicle. The driver can thus easily recognize the environment ahead of the second vehicle as if the driver was looking through a windshield of the second vehicle, when the driver is looking at the screen.

Alternatively or additionally the image comprising the object representing the at least one first vehicle can be displayed on a head-up display of the second vehicle. Displaying the image on the head-up display is particularly user-friendly and therefore particularly comfortable for the driver of the second vehicle, as the driver does not need to look away from a windshield of the second vehicle. Rather, the driver of the second vehicle can stay concentrated on the road ahead of him by looking through the windshield of the second vehicle. And the image comprising the object is displayed directly in the field of view of the driver by utilizing the head-up display.

Preferably, a viewing direction of the eyes of a driver of the second vehicle is tracked when the image is displayed on the head-up display. Tracking the viewing direction of the eyes of the user can be done by means of a driver monitoring system comprising a camera installed inside a cabin of the second vehicle. Therefore the image comprising the object can be displayed exactly at the correct position for the driver looking through the windshield of the second vehicle.

Preferably, in the image comprising the object representing the at least one first vehicle at least one rearward light of the at least one first vehicle is displayed on the display device of the second vehicle. Herein, the visibility of the at least one rearward light is increased with respect to the visibility of the at least one rearward light in the environment of the second vehicle. In other words the at least one rearward light of the at least one first vehicle is highlighted with respect to its visibility in the real environment, for example by increasing the brightness and/or the intensity of pixels representing the at least one rearward light in the image. By doing so, the driver of the second vehicle can particularly well recognize the at least one rearward light of the first vehicle.

Displaying the at least one rearward light in the image with the increased visibility can indicate to the driver of the second vehicle that the first vehicle is braking or performing a lane change, for example. In these cases rearward lights such as braking lights or a direction indicator light can be represented in the image displayed on the display device of the second vehicle. Consequently, by looking at the display device the driver of the second vehicle can realistically judge the traffic situation comprising the at least two vehicles, as if the rearward lights of the at least one first vehicle were perfectly visible. And as the driver of the second vehicle can adapt his driving mode to the maneuvers performed by the first vehicle, the driving safety is further increased.

Preferably, an intensity with which the at least one rearward light is displayed on the display device is set in dependence on a distance between the first vehicle and the second vehicle. Consequently, if the second vehicle approaches the first vehicle, the intensity of the pixels representing the at least one rearward light of the first vehicle is increased. This shows to the driver of the second vehicle a decreasing distance between the second vehicle and the first vehicle. Further, if a lateral distance between rear position lamps and/or braking lights of the first vehicle increases, the driver of the second vehicle can also conclude that the distance between the second vehicle and the first vehicle is decreasing. This also helps the driver of the second vehicle to adapt his driving mode in order to drive safely.

Preferably, an information indicating an at least intended activation of the at least one rearward light of the first vehicle is communicated to the second vehicle. This information is taken into consideration in displaying the at least one rearward light on the display device of the second vehicle. In such a configuration the first vehicle, in particular the preceding car, and the second vehicle, in particular the ego car or trailing car, are connected by means of a car-to-car or vehicle-to-vehicle communication system.

By communicating this information to the second vehicle a particularly reliably information at least on the intended lighting status of the at least on rearward light of the first vehicle can be taken into account by, for example, a control unit of the second vehicle. Even if a rearward light of the first vehicle has a failure, the first vehicle can communicate to the second vehicle that this rearward light should have been activated but is not working. But also if the rearward light is working but not visible for a camera of the second vehicle, the information on the at least intended activation status of this rearward light of the first vehicle is helpful for realistically displaying the rearward light on the display device of the second vehicle, in particular with the increased intensity.

Preferably, a plurality of images captured by respective cameras of a plurality of first vehicles are transmitted to the display device of the second vehicle. Herein, respective objects representing the respective first vehicle are integrated into the respective images. In other words the method can be also very helpful for the driver of the second vehicle, if a plurality of first vehicles are travelling in front of the second vehicle, but a visibility of these vehicles is reduced due to weather conditions, in particular fog or heavy rain.

The invention also relates to a computer program comprising instructions which, when the program is executed by a computer cause the computer to carry out the steps of the method according to the invention and preferably at least one of its embodiments.

Further, the invention also relates to a computer-readable medium, on which the computer program according to the invention is stored.

The advantages described with regard to the method according to the invention and its embodiments also apply to the computer program and the computer-readable medium and vice versa.

Moreover, the invention relates to a driver assistance system for providing visual information about at least one first vehicle in an environment of a second vehicle. Herein, the driver assistance system comprises a control unit which is configured to detect a reduced visibility of the at least one first vehicle in the environment of the second vehicle. The driver assistance system is further configured to receive an image captured by a camera of the at least one first vehicle and to transmit the image to a display device of the second vehicle. Still further, the driver assistance system is configured to integrate an object representing the at least one first vehicle into the image displayed on the display device of the second vehicle. Herein, the object is represented in the image at a position corresponding to the current position of the at least one first vehicle in the environment of the second vehicle. Thus, in a situation in which the reduced visibility of the at least one first vehicle in the environment of the second vehicle is detected, transmitting the image to the display device of the second vehicle and integrating the object into the image renders the at least one first vehicle particularly well visible for the driver of the second vehicle looking at the display device. Consequently, the driver assistance system, which is configured to carry out the method according to the invention and preferably at least one of its embodiments allows obtaining an increase in driving safety.

The advantages described with regard to the method according to the invention and its embodiments also apply to the driver assistance system and vice versa.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

BRIEF DESCRIPTION OF THE DRAWINGS

Therein Show.

In the FIG. same elements or elements having the same function are indicated by the same reference signs.

DETAILED DESCRIPTION OF THE INVENTION

Figure 1:
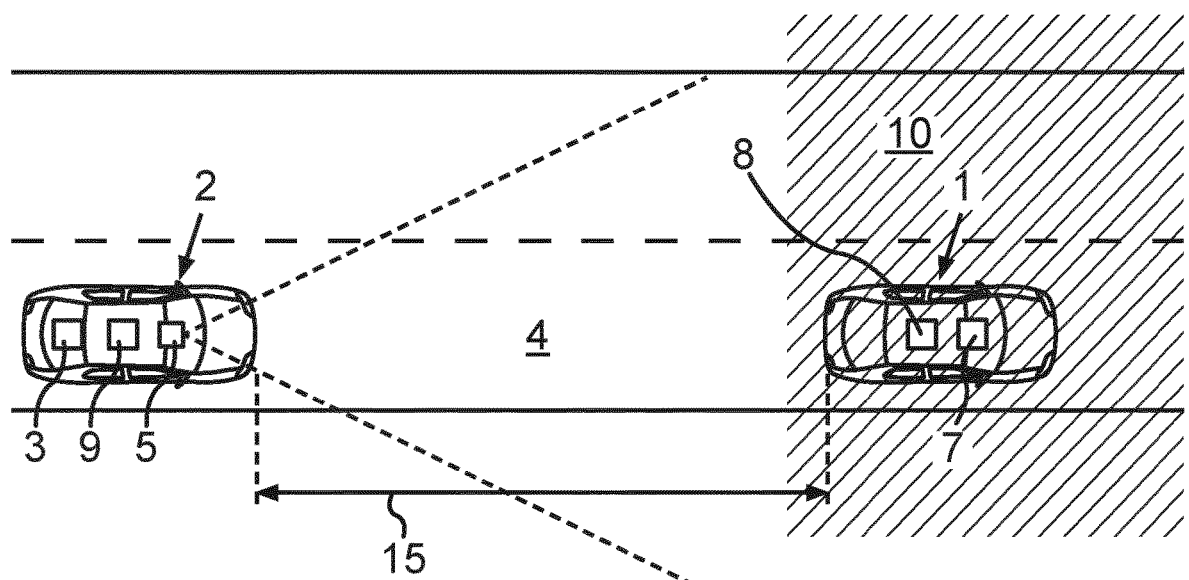
FIG. 1 schematically a situation in which a first vehicle is driving in front of a second vehicle, wherein fog which is present in the environment of the second vehicle reduces the visibility of the first vehicle for a driver of the second vehicle.

FIG. 1 schematically shows a situation in which a first vehicle 1, for example a passenger car, is driving in front of a second vehicle 2. The second vehicle 2, which is exemplarily shown to be also a passenger car, has a driver assistance system 3 which is only very schematically illustrated in FIG. 1. Components of the second vehicle 2 and the driver assistance system 3 can more easily be recognized in FIG. 2 which shows an enlarged, schematic view of the second vehicle 2. The second vehicle 2, in particular the driver assistance system 3 of the second vehicle 2 has detection means for detecting objects in an environment 4 of the second vehicle 2. In the case exemplarily shown in FIG. 2 these detection means comprise for one thing a camera 5 and on the other hand a distance sensor device which is preferably configured as a laser scanner 6. The positions of the camera 5 and the laser scanner 6 of the second vehicle 2 with respect to other components of the second vehicle 2 are only shown exemplarily and these detection means can be located at any appropriate position within and/or on the second vehicle 2.

The second vehicle 2 or ego car in the situation exemplarily shown in FIG. 1 is following the first vehicle 1 or preceding car. In a like manner as the second vehicle 2, the first vehicle 1 is also equipped with a camera 7 in a form of a frontal camera. The cameras 5, 7, in particular video cameras, of the vehicles 1, 2 are therefore adapted to capture images in respective areas ahead of each one of the two vehicles 1, 2. Both vehicles 1, 2 are further connected to each other via a wireless communication link enabling a vehicle-to-vehicle communication. Consequently, the first vehicle 1 comprises a communication device 8 which is able to transmit data to the second vehicle 2 and to receive data from the second vehicle 2. In a like manner the second vehicle 2, in particular the driver assistance system 3, comprises a communication device 9 which is configured to receive data from the first vehicle 1 and to transmit data to the first vehicle 1.

In FIG. 1 a situation is exemplarily shown in which the first vehicle 1 is not well visible for a driver of the second vehicle 2. This can be due to the presence of fog 10 ahead and around the second vehicle 2. Due to the fog 10 not only the driver of the second vehicle 2 can hardly perceive the first vehicle 1. Rather, the situation can be such that also the camera 5 of the second vehicle 2 can hardly detect the first vehicle 1. In other words it can be difficult to detect the presence of the first vehicle 1 in the environment 4 of the second vehicle 2 by analyzing images captured by the camera 5 of the second vehicle 2. Other low visibility situations can comprise the presence of rain, in particular heavy rain in the environment 4 of the second vehicle 2. In such situations the connectivity between the two vehicles 1, 2 which can be established by utilizing the communication devices 8, 9 is taken advantage of. The goal of this is to make the first vehicle 1 visible to the driver of the second vehicle 2, even though in reality the first vehicle 1 is more or less hidden in the fog 10. The driver of the second vehicle 2 is therefore enabled to see the hidden first vehicle 1 as if there was no fog 10, heavy rain or the like. This shall be explained with reference to FIG. 3 and FIG. 4 in particular.

Figure 3:
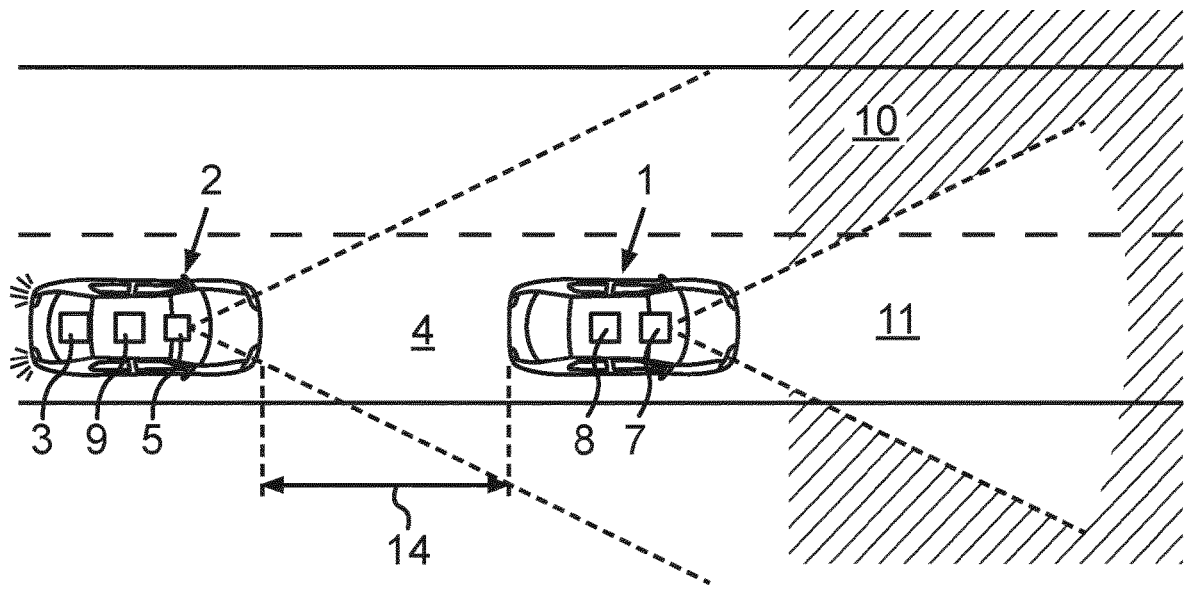
FIG. 3 a situation showing the second vehicle in the same position as in FIG. 1, wherein the first vehicle is shown at a position previously occupied by the first vehicle, FIG. 4 the situation according to FIG. 3, wherein a three-dimensional model of the first vehicle or preceding vehicle is represented at a current position of the first vehicle.
Figure 6:
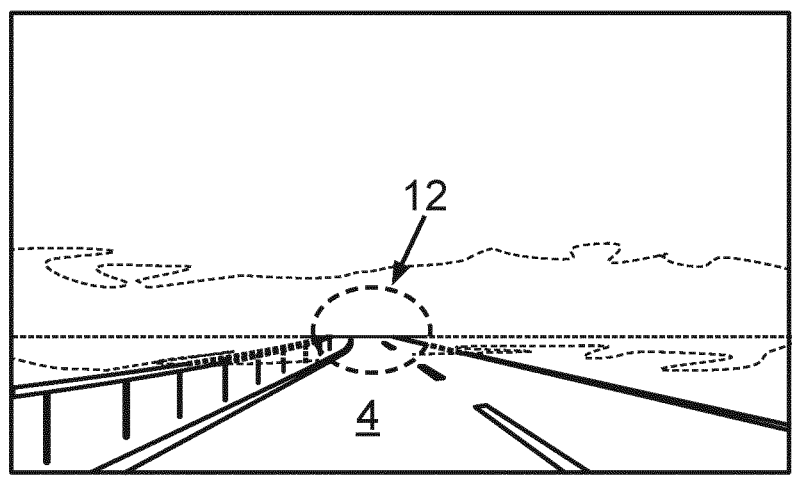
FIG. 6 the situation according to FIG. 5, wherein an image captured by a camera of the first vehicle is displayed in the field of view of the driver of the second vehicle.

In FIG. 1 the situation is shown in which the second vehicle 2 or ego car or trailing car and a first vehicle 1 or preceding car or leading car are both located at their current positions. FIG. 3 shows a situation in which the second vehicle 2 is still at its current position. However, the first vehicle 1 is shown at a previous position. In other words, before reaching the current position shown in FIG. 1 the first vehicle 1 was located or situated at the position shown in FIG. 3. The camera 7 of the first vehicle 1 captures an image of an area 11 situated ahead of the first vehicle 1. FIG. 6 shows a corresponding image 12 which is captured by the camera 7 of the first vehicle 1 situated at the previous position according to FIG. 3. As this image 12 is taken ahead of the first vehicle 1, the image 12 represents a view of the environment 4 as if a driver of the second vehicle 2 was looking through a windshield of the first vehicle 1 situated at the previous position according to FIG. 3. Consequently, in the image 12 a portion of the fog 10 has disappeared. In other words, the visibility in the fog 10 for the driver of the second vehicle 2 can be increased, as the image 12 is shown or presented to the driver of the second vehicle 2.

However, the purpose in the context of the present disclosure is not to make the first vehicle 1 disappear for the driver of the second vehicle 2. Rather, an object representing the first vehicle 1, in particular a three-dimensional model 13

Figure 4:
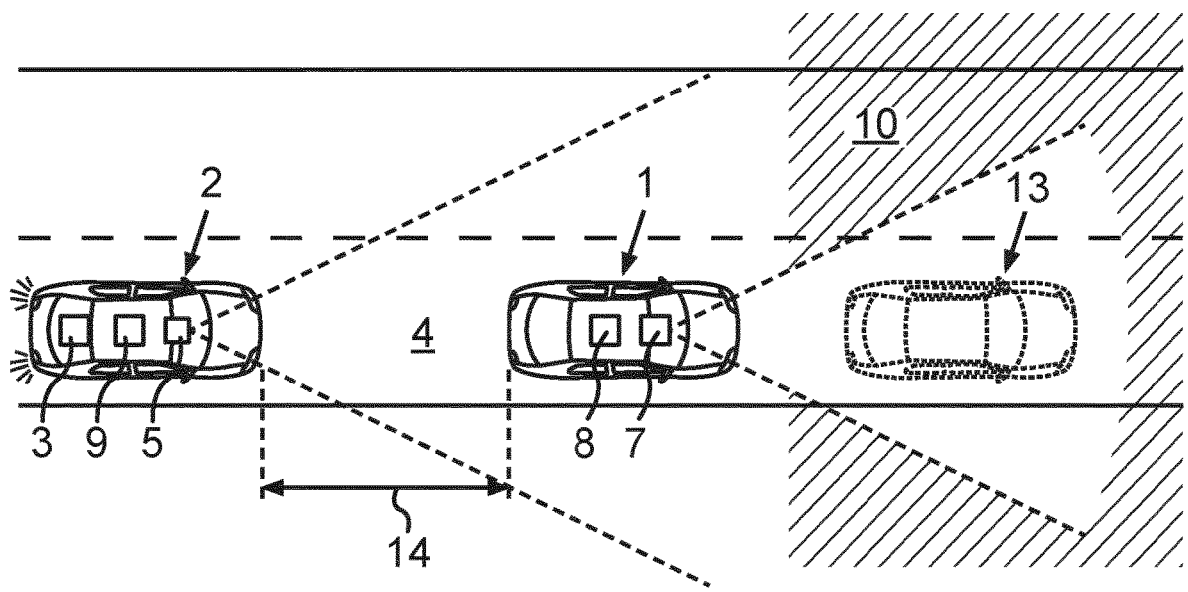
Figure 7:
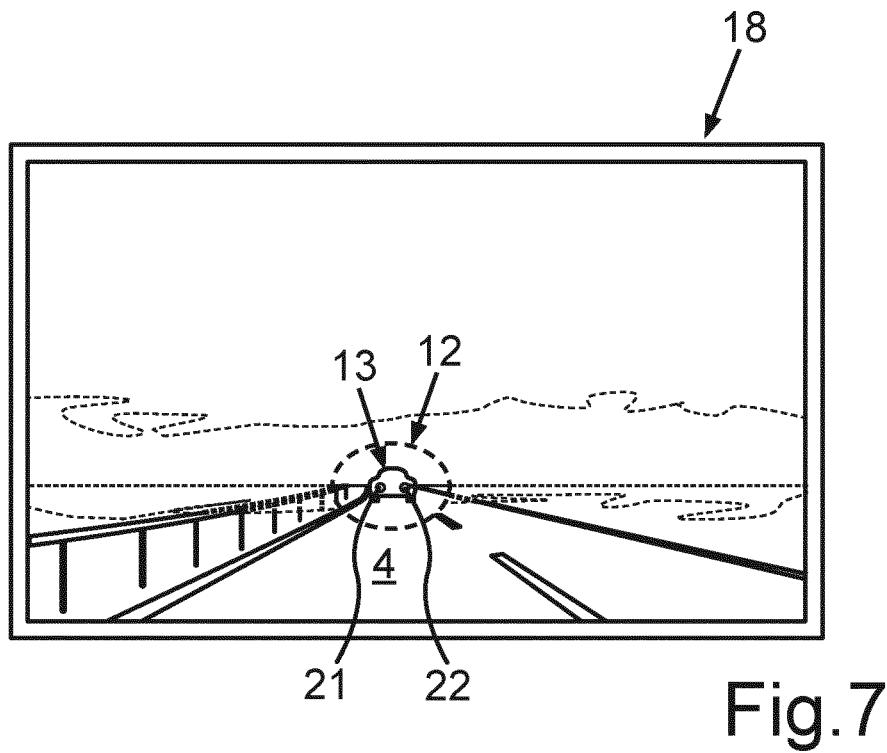
FIG. 7 the situation according to FIG. 4, wherein the three-dimensional model of the first vehicle is integrated into the image captured by the camera of the first vehicle and transmitted to the second vehicle.

(see FIG. 4) of the first vehicle 1, is integrated into the image 12. This model 13 is located in the image 12 at a position, which corresponds to the current position of the first vehicle 1 in the real environment 4 according to FIG. 1. The three-dimensional model 13 which is integrated into the image 12, for example by superimposing the three-dimensional model 13 on the image 12 captured by the first vehicle 1, is also shown in FIG. 7. The approach detailed above, which comprises the presentation of the image 12 together with the model 13 to the driver of the second vehicle 2, allows the driver of the second vehicle 2 to see the first vehicle 1 as if there was no fog 10 or the like ahead of the second vehicle 2. This situation is shown in FIG. 4. In reality, however, the first vehicle 1 is at least partially hidden by the fog 10 in the environment 4 of the second vehicle 2.

As can be seen from FIG. 7, it is advantageous to utilize the image 12 for representing the three-dimensional model 13 to the driver of the second vehicle 2, namely the image 12 which has been captured by the first vehicle 1 before the first vehicle 1 has reached its current position. For one thing, and according to the situation shown in FIG. 3, a distance 14 between the second vehicle 2 at its current position and the first vehicle 1 at its previous position is smaller than a distance 15 between the two vehicles 1, 2, when both vehicles 1, 2 are at their current positions (see FIG. 1). Therefore the surface area of the image 12 displayed to the driver of the second vehicle 2 is larger than if the first vehicle 1 had already reached its current position and the image captured at the current position of the first vehicle 1 was utilized as the image displayed to the driver of the second vehicle 2.

In addition, the probability that the first vehicle 1 disappears in the fog 10 ahead of the second vehicle 2 is reduced, as the image 12 captured when the first vehicle 1 was situated at its previous position is utilized for displaying the image 12 to the driver of the second vehicle 2. The relatively large surface area of the image 12 is also helpful in allowing the driver of the second vehicle 2 to see the three-dimensional model 13 integrated into the image 12 in a particularly clear manner.

In order to determine the current position of the first vehicle 1, at which the three-dimensional model 13 is represented in the image 12, at least one sensor device of the second vehicle 2 can be utilized. In other words, even if the first vehicle 1 is not or not very well visible to the naked eye, by means of at least one sensor device such as the camera 5 and in particular the laser scanner 6 of the second vehicle 2 the presence of the first vehicle 1 at its current position in the environment 4 of the second vehicle 2 can be readily detected. It is also possible to transmit position data of the first vehicle 1 to the second vehicle 2 by utilizing the vehicle-to-vehicle communication link that can be established between the communication devices 8, 9.

Figure 5:
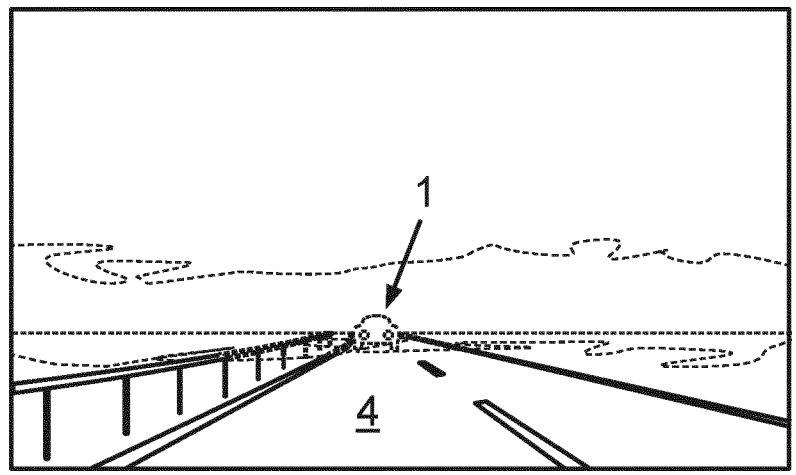
FIG. 5 the situation according to FIG. 1, but as seen by a driver of the second vehicle looking through a windshield of the second vehicle.

However, even in a situation represented in FIG. 5, in which the first vehicle 1 is hardly visible to with the eyes of the driver of the second vehicle 2, it might be possible that the presence of the first vehicle 1 in the environment 4 of the second vehicle 2 can be detected by analyzing images or frames captured or taken by the camera 5 of the second vehicle 2. To analyze these images the driver assistance system 3 of the second vehicle 2 can comprise a control unit 16, in particular an electronic control unit. This control unit is also configured to analyze the data obtained by the laser scanner 6. Therefore, by analyzing the images or pictures captured by the camera 5 and/or by analyzing the data obtained by the laser scanner 6, the current position of the first vehicle 1 in the environment 4 can be detected by the driver assistance system 3 of the second vehicle 2.

In the situation with low visibility, which is for example due to the presence of the fog 10, rain or the like in the environment 4 of the second vehicle 2, the second vehicle 2 recovers a video stream in the form of the images captured by the camera 7 of the first vehicle 1 situated in front of the second vehicle 2. For one thing this helps in better visualizing the surrounding environment 4 to the driver of the second vehicle 2. And as the driver of the second vehicle 2 has a better view of the road ahead, the distance of vision is augmented for the driver of the second vehicle 2. This can be done by presenting to the driver of the second vehicle 2 the image 12 as shown in FIG. 6.

Further, by reproducing virtually the first vehicle 1 in the form of the three-dimensional model 13 within the image 12, the current position of the first vehicle 1 can be indicated to the driver of the second vehicle 2. To present or show the image 12 comprising the object in the form of the three-dimensional model 13 to the driver of the second vehicle 2, different display devices of the second vehicle 2 can be utilized.

For example, the second vehicle 2 can be equipped with a screen 17 which can be integrated into an instrument panel of the second vehicle 2. On this screen 17 images 18 captured by the camera 5 of the second vehicle 2 can be displayed to the driver of the second vehicle 2. One example of such an image 18 is shown in FIG. 7. Therefore, the view shown in FIG. 7 can either be a view of the driver of the second vehicle 2 through a windshield 19 of the second vehicle 2 (see FIG. 2) or the image 18 displayed on the screen 17. In the latter case the image 12 comprising the object in form of the three-dimensional model 13 is superimposed on the further image 18 captured by the camera 5 of the second vehicle 2.

Figure 2:
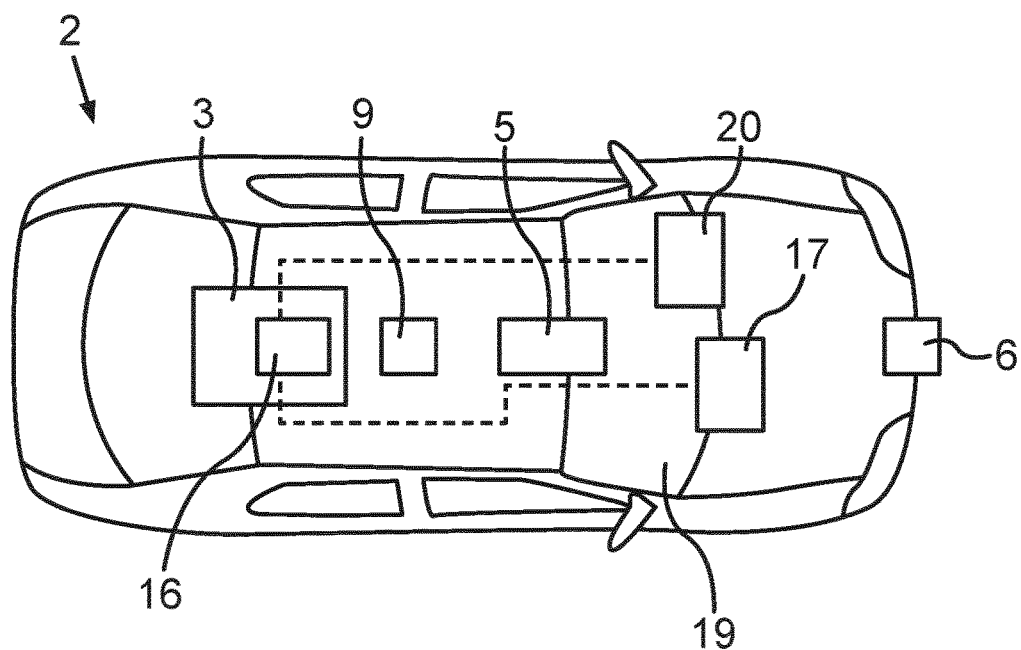
FIG. 2 a schematic, but more detailed view of the second vehicle.

However, the second vehicle 2 can alternatively or additionally be equipped with a head-up display 20 as display device (see FIG. 2). In this case, the image 12 comprising the object in form of the three-dimensional model 13 can be displayed on the head-up display of the second vehicle 2. In this situation the driver of the second vehicle 2 does not need to look at the screen 17 located in particular below the windshield 19 in order to see the image 12 comprising the model 13. Rather, the driver of the second vehicle 2 can continue looking through the windshield 19, and the image 12 comprising the three-dimensional model 13 is projected in the field of view of the driver of the second vehicle 2.

If the head-up display 20 is particularly large, a particularly big part of the windshield 19, in particular the whole windshield 19 of the second vehicle 2 can be utilized for displaying the image 12 on the head-up display 20. In both cases, i.e. when the screen 17 or the head-up display 20 is utilized, the three-dimensional model 13 of the first vehicle 1 is displayed at its current position in the environment 4 of the second vehicle 2.

In order to integrate the three-dimensional model 13 into the image 12, one of the images or frames captured by the camera 7 of the first vehicle 1 before the first vehicle 1 has reached its current position is preferably utilized. In FIG. 6 a situation is shown in which a fusion of the images or frames captured by the camera 5 of the second vehicle 2 and of the images or frames captured by the camera 7 of the first vehicle 1, i.e. the preceding car, has taken place. And in FIG. 7 the integration of the three-dimensional model 13 into these images is illustrated.

A further implementation of the method shall be explained with reference to FIG. 7 and to FIG. 8. As can be seen from FIG. 7, the three-dimensional model 13 of the first vehicle 1 has rearward lights for example in the form of position lamps 21, 22. Further rearward lights of the three-dimensional model 13 can be braking lights of the first vehicle 1, direction indicator lights or blinkers or the like.

Figure 8:
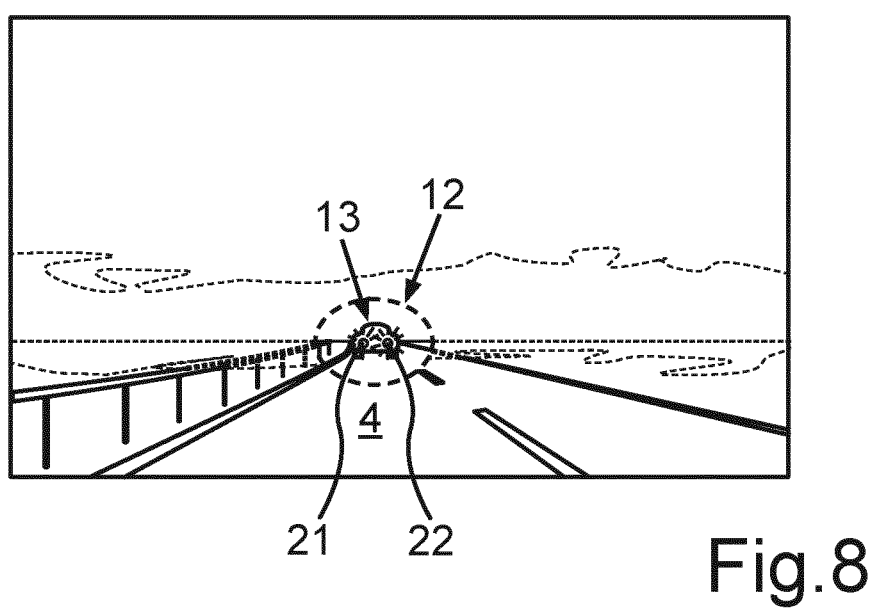
FIG. 8 the situation according to FIG. 7, wherein rearward lights of the three-dimensional model representing the first vehicle are shown with an increased intensity.

Preferably, these rearward lights, exemplarily shown in FIG. 8 as the position lamps 21, 22, are not only represented in the image 12. Rather, a visibility of these rearward lights is increased with respect to the visibility of these rearward lights in the real environment 4 of the second vehicle 2. In other words, pixels representing the position lamps 21, 22 and/or other such rearward lights of the first vehicle 1 are amplified or intensified with respect to their visibility. Thus, the driver of the second vehicle 2 looking at the screen 17 and/or at the head-up display 20 will perceive the rearward lights of the first vehicle 1 more easily. This is due to the fact that these rearward lights, in the example chosen the position lamps 21, 22, are presented with the increased intensity.

As the driver assistance system 3 effects this representation of the rearward lights with the increased intensity the driver of the second vehicle 2 can be alerted if for example the driver of the first vehicle 1 decelerates. In this case the braking lights of the first vehicle 1 are shown with an increased intensity in the three-dimensional model 13 contained within the image 12. In the same manner the driver of the second vehicle 2 can be alerted that a lane change of the first vehicle 1 will take place by representing a rearward light configured as a, in particular blinking, direction indicator light of the first vehicle 1 in the three-dimensional model 13. The driver of the second vehicle 2 can therefore perceive the rearward lights of the first vehicle 1 as if there was perfect visibility. To achieve this, the driver of the second vehicle 2 merely needs to look at the screen 17 or at the display device in form of the head-up display 20, i.e. keep on looking through the windshield 19 of the second vehicle 2.

Figure 9:
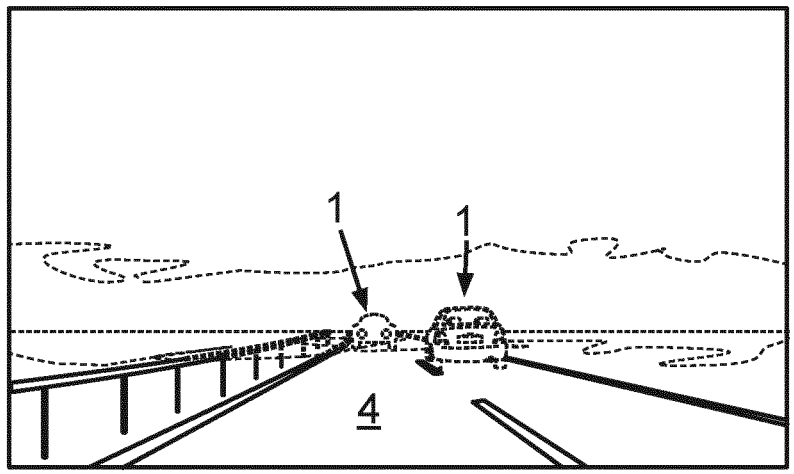
FIG. 9 the situation according to FIG. 5, but with a plurality of first vehicles travelling in the fog in front of the second vehicle.

FIG. 9 illustrates a situation in which a plurality of first vehicles 1 are present in the environment 4 of the second vehicle 2. In other words a multiplicity of first vehicles 1 are preceding the ego car or second vehicle 2. Also in this situation the respective images 12 captured by the respective cameras 7 of the first vehicles 1 are displayed on the display device of the second vehicle 2 (see FIG. 10), i.e. on the screen 17 and/or on the head-up display 20. Each one of the images 12 preferably comprises the three-dimensional model 13 representing the respective first vehicle 1 at its current position in the fog 10.

Figure 10:
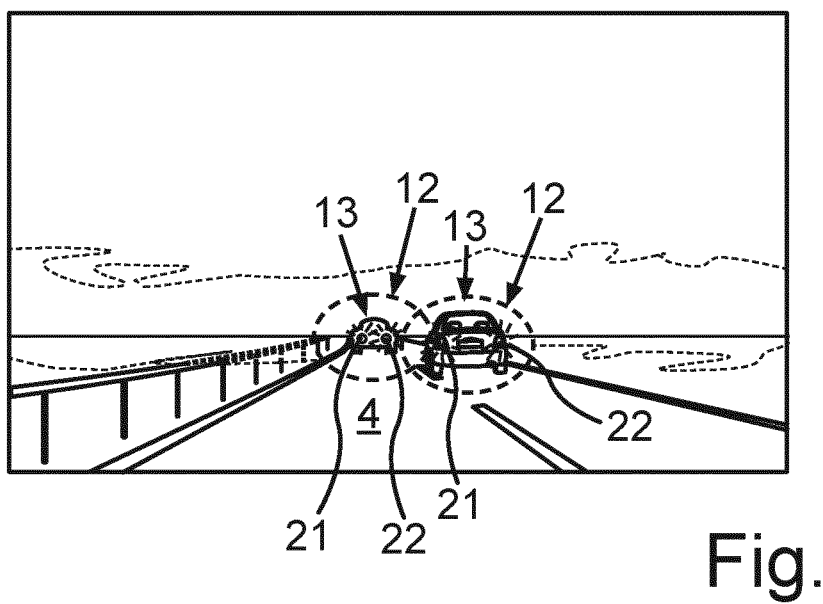
FIG. 10 the situation according to FIG. 8, but with a plurality of three-dimensional models with amplified or intensified representations of their rearward lights.

FIG. 10 further shows that the rearward lights, for example the position lamps 21, 22 of the plurality of first vehicles 1, are represented with an increased intensity in the respective three-dimensional model 13.

The examples show how in cases of a detected low visibility in the environment 4 of the second vehicle 2 presenting a virtual image 12 of the leading vehicle or first vehicle 1 on the display device of the second vehicle 2 can increase the driving safety for the driver of the second vehicle 2.

The invention claimed is:

1. A method for providing visual information about at least one first vehicle in an environment of a second vehicle, comprising:
   detecting a reduced visibility of the at least one first vehicle in the environment of the second vehicle;
   transmitting an image captured by a camera of the at least one first vehicle to a display device of the second vehicle; and
   integrating an object representing the at least one first vehicle into the image displayed on the display device of the second vehicle,
   wherein the object is represented in the image at a position which corresponds to the current position of the at least one first vehicle in the environment of the second vehicle,
   wherein the image comprising the object representing the at least one first vehicle is displayed on a head-up display of the second vehicle, wherein a viewing direction of the eyes of a driver of the second vehicle is tracked when the image is displayed on the head-up display.

2. The method according to claim 1, wherein a view representing at least a section of an area ahead of the at least one first vehicle is transmitted as the image displayed on the display device of the second vehicle.

3. The method according to claim 1, wherein as the image a view captured by the camera of the at least one first vehicle before reaching its current position is displayed on the display device of the second vehicle.

4. The method according to claim 1, wherein as the object representing the at least one first vehicle a three-dimensional model of the at least one first vehicle is displayed on the display device of the second vehicle, wherein data defining the three-dimensional model are transmitted from a communication device of the at least one first vehicle to a communication device of the second vehicle.

5. The method according to claim 1, wherein the current position of the at least one first vehicle in the environment of the second vehicle is determined by at least one sensor device of the second vehicle and/or position data indicating the current position of the at least one first vehicle in the environment of the second vehicle are transmitted to the second vehicle.

6. The method according to claim 1, wherein the image comprising the object representing the at least one first vehicle is superimposed on least one further image captured by a camera of the second vehicle, wherein the least one further image is displayed on a screen of the second vehicle.

7. The method according to claim 6, wherein a view representing at least a section of the environment of the second vehicle is displayed on the screen as the least one further image, wherein the section is situated ahead of the second vehicle.

8. The method according to claim 1, wherein in the image comprising the object representing the at least one first vehicle at least one rearward light of the at least one first vehicle is displayed on the display device of the second vehicle, wherein the visibility of the at least one rearward light is increased with respect to the visibility of the at least one rearward light in the environment of the second vehicle.

9. The method according to claim 8, wherein an intensity with which the at least one rearward light is displayed on the display device is set in dependence on a distance between the first vehicle and the second vehicle.

10. The method according to claim 8, wherein an information indicating an at least intended activation of the at least one rearward light of the first vehicle is communicated to the second vehicle, and this information is taken into consideration in displaying the at least one rearward light on the display device of the second vehicle.

11. The method according to claim 1, wherein a plurality of images captured by respective cameras of a plurality of first vehicles are transmitted to the display device of the second vehicle, and respective objects representing the respective first vehicle are integrated into the respective images.

12. A non-transitory computer-readable medium, on which a computer program is stored and causes a computer to carry out the steps of the method according to claim 1.

\* \* \* \* \*